United States Patent [19]

Schmidt, III et al.

[11] 4,186,258

[45] Jan. 29, 1980

[54] SUBSTANTIALLY AMORPHOUS POLYOLEFINS USEFUL AS PRESSURE-SENSITIVE ADHESIVES

[75] Inventors: Robert R. Schmidt, III; Jerry D. Holmes, both of Longview, Tex.

[73] Assignee: Eastman Kodak Company, Rochester, N.Y.

[21] Appl. No.: 956,827

[22] Filed: Nov. 2, 1978

Related U.S. Application Data

[62] Division of Ser. No. 828,575, Aug. 29, 1977, Pat. No. 4,143,858.

[51] Int. Cl.$^2$ ............................ C08F 8/00; C08F 8/42; C08F 8/50
[52] U.S. Cl. .................................... 525/342; 525/371; 528/481
[58] Field of Search ................... 526/29, 48.2; 528/481

[56] References Cited

U.S. PATENT DOCUMENTS

| | | | |
|---|---|---|---|
| 3,081,288 | 3/1963 | Edmonds | 526/48.2 |
| 3,341,621 | 9/1967 | Hagemeyer et al. | 528/481 |
| 3,562,788 | 2/1971 | Weemes et al. | 528/481 |
| 3,629,373 | 12/1971 | Embree | 528/481 |
| 4,143,858 | 3/1979 | Schmidt et al. | 526/48.2 |

FOREIGN PATENT DOCUMENTS

| | | | |
|---|---|---|---|
| 42-670 | 1/1967 | Japan | 526/29 |
| 44-22612 | 9/1969 | Japan | 526/29 |

*Primary Examiner*—William F. Hamrock
*Attorney, Agent, or Firm*—Clyde L. Tootle; Daniel B. Reece, III

[57] ABSTRACT

The invention relates to a process for the treatment of substantially amorphous polyolefins to provide permanently tacky, low viscosity materials which have useful pressure-sensitive adhesive properties. These permanently tacky amorphous polyolefin homo- and copolymers, as well as blends of such amorphous polyolefins with crystalline polyolefins containing up to 20 weight percent crystalline polyolefin, are novel pressure-sensitive adhesives.

2 Claims, No Drawings

SUBSTANTIALLY AMORPHOUS POLYOLEFINS USEFUL AS PRESSURE-SENSITIVE ADHESIVES

This is a division of application Ser. No. 828,575 filed Aug. 29, 1977, now U.S. Pat. No. 4,143,858.

This invention relates to acid catalyst treated substantially amorphous polyolefin compositions having a novel combination of properties. More specifically, the invention relates to acid catalyst treated substantially amorphous polyolefins which provide pressure-sensitive adhesive compositions having permanent tackiness.

Pressure-sensitive adhesive (PSA) products have experienced a rapid growth rate in recent years because of their ease of application. Typical pressure-sensitive adhesive applications include, for example, tapes (consumer, industrial, and surgical), labels, decals, films, floor tile and wall and shelf coverings. Until recently, virtually all pressuresensitive compositions were based on blends of high molecular weight synthetic and natural rubbers with tackifiers. Frequently, fillers such as zinc oxide or magnesium oxide are used in PSA formulations which are applied to opaque backing substrates. Typical backing materials include paper, cellophane, plasticized poly(vinyl chloride), polyester film, cellulose acetate film, cloth, foamed polymers (e.g., foamed polystyrene or polypropylene), metal foils, felt, cork and the like. Although PSA compositions have generally been applied to the backings from solvents, there is a need for PSA materials which can be applied as hot-melts to eliminate solvent pollution during manufacturing of the products. Also, a non-solvent adhesive is desirable since many solvents are in short supply.

In polymerization processes for polymerizing propylene using a wide variety of catalysts, some product is formed which is hexane soluble which has been defined as amorphous polypropylene. This material, however, may contain small fractions which are crystalline. This amorphous polypropylene, when solidified from the melt, is initially tacky and has some pressure-sensitive tack. However, on standing it loses this surface tackiness, due to crystallization of the crystallizable fraction. These materials for the purposes of this invention are defined as substantially amorphous polyolefins.

Substantially amorphous polypropylene provides a good hot-melt adhesive when used alone or blended with other materials. These substantially amorphous polyolefins are also useful in the lamination of paper-to-paper, paper-to-foil and the like when used as a hot-melt adhesive. These substantially amorphous polyolefins, however, are not useful as pressure-sensitive adhesives as they lose their tackiness after solidification. For example, substantially amorphous polypropylene begins to lose its surface tack within six minutes after solidifying from the melt due to crystallization of a polymer fraction. After about three hours the substantially amorphous polypropylene has become virtually nontacky. Therefore, it would be an advance in the state of the art to provide a permanently tacky substantially amorphous polyolefin which can be used as a pressure-sensitive adhesive.

Accordingly, it is one of the objects of this invention to provide a novel pressure-sensitive adhesive.

Another and further object of this invention is to provide a pressure-sensitive adhesive having good adhesive properties which can be applied without the use of a solvent.

A still further object of the invention is to provide an adhesive prepared from a substantially amorphous polyolefin composition which is tacky at ambient temperatures.

Another and still further object of this invention is a process for preparing the permanently tacky amorphous polyolefin compositions useful as pressure-sensitive adhesives.

A still further object of the invention is the use of these permanently tacky amorphous polyolefins as pressure-sensitive adhesives.

In accordance with the present invention we have found that a substantially amorphous polyolefin, such as amorphous polypropylene, can be treated with an acid catalyst at 250° C. or higher to provide a low viscosity, permanently tacky, hot-melt pressure-sensitive adhesive composition. This treatment renders the substantially amorphous polyolefin permanently tacky. Substantially amorphous polyolefins useful in the practice of this invention include substantially amorphous homopolymers of 1-olefins containing 3 to 5 carbon atoms, substantially amorphous copolymers prepared from ethylene and 1-olefins containing 3 to 5 carbon atoms, and substantially amorphous propylene or 1-butene/higher 1-olefin copolymers containing less than 40 mole percent of at least one higher 1-olefin of the group 1-hexene, 1-heptene, 1-octene, 1-nonene, and 1-decene. In defining these polymeric compositions it should be noted that the term "amorphous" as used herein defines a polymeric composition that may contain a small amount of crystallizable portion. Also, these substantially amorphous polyolefins can be used as a blend with crystalline polyolefins. The crystallizable polymer component of these blends, however, should not exceed about 20% crystalline polymer.

The melt viscosity of the substantially amorphous polyolefin materials is generally in the range of about 100 to 200,000 cp. at 190° C. while the treated products of this invention generally have melt viscosities of about 30 to about 50,000 cp. at 190° C. (determined by ASTM D1238). Thus, the acid catalyst treatment causes a decrease in the melt viscosity of the substantially amorphous polyolefin and this treatment also imparts permanent tack to the amorphous polyolefin composition.

The properties of amorphous polypropylene are changed significantly by treatment with acid catalyst. Such catalysts include the strong Lewis acid type catalysts such as aluminum halides, i.e., aluminum trichloride, antimony halides, i.e., antimony dichloride, boron halides, i.e., boron trifluoride, titanium halides, i.e., titanium trichloride, and silica-aluminum type catalyst such as Davison grade 979 silica-alumina catalyst. In particular, it becomes permanently pressure sensitive, less regular, and less opaque; has a lower glass transition temperature (Tg); and contains no vinyl or vinylidene unsaturation. It should be noted that even the higher viscosity amorphous polypropylene can be made pressure sensitive by this procedure.

The temperature used in treating the amorphous polyolefins is not critical. For example, temperatures of 250° C. up to 325° C. are generally employed and provide satisfactory results in 2 to 3 hours. However, a higher temperature can be employed and provides similar results.

One substantially amorphous polyolefin useful in this invention is the essentially noncrystalline hexane soluble polyolefins, such as the substantially amorphous polypropylene, formed in minor amounts during the production of crystalline polypropylene by the polymerization of propylene in the presence of stereospecific catalysts by a process as disclosed in U.S. Pat. No. 3,679,775, incorporated herein by reference. The solid substantially amorphous polypropylene has a viscosity of about 1,000 to about 50,000 centipoise at 190° C. (ASTM D-1238), and preferably from about 1,500 to about 15,000 centipoise. The substantially amorphous polyolefin can be blended with crystalline, hexane insoluble polyolefin in an amount of up to about 20 percent by weight. One such commercially available amorphous polyolefin useful in preparing the pressure-sensitive adhesives is Eastobond M-5 polyolefin available from Eastman Chemical Products, Inc. These substantially amorphous polymers can also be produced directly, i.e., without production of substantial amounts of crystalline copolymer by polymerizing a mixture of propylene and butene-1 in mineral spirits at a temperature of about 100° C. to about 180° C. and a pressure in the range of about atmospheric to about 2,000 psig. with the catalyst containing an organopolylithium aluminum compound and the HA or AA forms of titanium trichloride in a mole ratio of 0.01–0.05/0.1–1.0/1 by a polymerization process as disclosed in U.S. Pat. No. 3,679,775, which disclosure is incorporated herein by reference. Methods of preparation of the organopolylithium aluminum compounds are also disclosed in U.S. Pat. No. 3,679,775. These amorphous propylene-1-butene copolymers generally contain from about 30 percent to about 75 weight percent of butene-1, and have a melt viscosity of about 100 to 100,000 centipoise at 190° C., a solubility in refluxing hexane of at least 99 weight percent, a solubility in refluxing diethyl ether of at least 60 weight percent, a ring and ball softening point in the range of about 78 to 120° C., and a differential scanning calorimeter melting point not greater than 120° C. The substantially amorphous polyolefin could be degraded to the desired melt viscosity if one starts with a high molecular weight substantially amorphous polymer.

Suitable reaction vessels include those made from glass or metal. For example, the reactions may be conducted in glass flasks, glass lined reactors, steel autoclaves, and the like. The reactions may be conducted in the presence of air or under inert gases such as nitrogen. Although not required, it is also possible to carry out the acid catalyst treatment in the presence of an inert solvent such as heptane.

The pressure-sensitive adhesives of this invention may be stabilized by the addition of conventional stabilizers for polyolefin materials such as dilauryl thiodipropionate, Plastanox 1212 (lauryl stearyl thiodipropionate), Irganox 1010 {pentaerythritol tetrakis[3(3,5-di-tert-butyl-4-hydroxyphenyl)propionate]}, Eastman Inhibitor DOPC (dioctadecyl p-cresol), Plastanox 2246 [2,2'-methylene bis(4-methyl-6-tert-butylphenol)], and Ethyl 702 [4,4'-methylene bis(2,6-di-tet-butylphenol)], or combinations of such stabilizers. Effective stabilizer concentrations may range from about 0.1 to about 0.5% by weight. For example, 0.25% Irganox 1010 or a combination of 0.25% Irganox 1010 with 0.25% Plastanox 1212 provides good melt viscosity and color stability when the adhesive is maintained in molten form at 350° F. for 8 hours or longer.

The adhesives of the invention may be used alone or in mixture with other materials, such as polyethylene waxes, polypropylene waxes, amorphous polypropylene, amorphous block ethylene/propylene copolymer, paraffin, polyterpenes such as those commercially available and sold as "Nirez 1100", "Piccolyte S10", "Piccolyte 40", "Piccolyte 100", or "Piccolyte 135"; hydrocarbon resins such as "Piccopale 85", "Piccopale 100", "Staybelite", or DAC-B hydrocarbon resin, rubber components such as ethylene/propylene copolymers, styrene/butadiene (or isoprene) block copolymers, and styrene/butadiene copolymers and the like.

Small amounts of pigments, colorants, and other additives may be added to the treated polyolefins as desired.

The invention can be further illustrated by the following examples although it will be understood that these examples are included merely for purposes of illustration and are not intended to limit the scope of the invention.

EXAMPLE 1

About 200 grams of low viscosity substantially amorphous polypropylene (melt viscosity 1,800 cp. at 190° C.) is charged to a 500 ml. resin flask. The flask is equipped with mechanical stirrer, nitrogen inlet, and temperature probe. The polymer is heated under a nitrogen blanket to 250° C. and is treated with 2 percent of Davison grade 979 silica-alumina catalyst while being stirred. After 3 hours, 0.4 percent of Irganox 1010 antioxidant was added, the reaction mixture cooled to 200° C., and the treated amorphous polypropylene filtered through a heated funnel. The results obtained are shown in Table I, which contrasts amorphous polypropylene, amorphous polypropylene treated at 250° C. with 2 percent of the silica-alumina catalyst for 3 hours, and an amorphous polypropylene thermally degraded without catalyst at 250° C. for 3 hours.

Table I

Comparison of Properties of Amorphous Polypropylene, Silica-Alumina Treated Amorphous Polypropylene, and Thermally Degraded Amorphous Polypropylene

| Property | Test Method | Run 1 | Run 2 | Run 3 | Conclusions |
|---|---|---|---|---|---|
| Viscosity at 190° C., cp. | Brookfield Melt Viscosity | 1,375 | 1,325 | 1,800 | |
| Softening point | Ring and ball | 93° C. | 105° C. | 105° C. | |
| Tg | DSC | −25° C. | −18° C. | −16° C. | Tg lowered 9° C. by Si-Al |
| Regularity | $C^{13}$ NMR | Fewer Isotatic triads than amorphous polypropylene and Run 2 | — | — | Run 1 less regular than amorphous polypropylene and Run 2 |
| Unsaturation | IR | <0.02% vinyl <0.02% vinylidene | 0.37% vinyl 0.09% vinylidene | 0.36% vinyl 0.18% vinylidene | Saturation migrates internally during Si-A treatment |
| | $Br_2$ | 0.39% total unsaturation | 0.45% total unsaturation | — | |
| Tack | Probe Tack | 150 g. | 0 g. | Not tacky | to Si-Al imparts tack |

Table I-continued
Comparison of Properties of Amorphous Polypropylene, Silica-Alumina Treated Amorphous Polypropylene, and Thermally Degraded Amorphous Polypropylene

| Property | Test Method | Run 1 | Run 2 | Run 3 | Conclusions |
|---|---|---|---|---|---|
| | | | | touch | |

Run 1: amorphous polypropylene was treated for 3 hours at 250° C. with 2 weight percent Davison Grade 979 silica-alumina catalyst.
Run 2: amorphous polypropylene was heated for 3 hours at 250° C.
Run 3: amorphous polypropylene (untreated)

EXAMPLE 2

About 200 grams of low viscosity substantially amorphous polypropylene (melt viscosity 1,800 cp. at 190° C.) is charged to a 500 ml. resin flask. The flask is equipped with mechanical stirrer, nitrogen inlet, and temperature probe. The polymer is heated under a nitrogen blanket to the desired temperature and is treated with the indicated amount of Davison grade 979 silica-alumina catalyst while being stirred. After the specified time, 0.4 percent Irganox 1010 antioxidant was added, the reaction mixture cooled to 200° C., and filtered through a heated funnel. The results obtained are shown in Table II which summarizes the experimental results. It is noted that at 200° C. even 2 percent catalyst does not produce a pressure-sensitive product, and at 250° C. at least 1 percent silica-alumina catalyst is necessary.

Table II
Treatment of Amorphous Polypropylene with Silica-Alumina Catalyst

| Run | Weight Si-Al Catalyst | Temperature, °C.; Time, Hr. | Viscosity at 190° C., cp. | Tacky |
|---|---|---|---|---|
| 1 | 2 | 200; 3 | 1,175 | No |
| 2 | 2 | 250; 3 | 1,375 | Yes |
| 3 | 2 | 250; 4 | 900 | Yes |
| 4 | 1 | 250; 3 | 1,400 | Yes |
| 5 | 0.5 | 250; 3 | 1,550 | No |
| 6 | 0.1 | 250; 3 | 1,500 | No |
| 7 | 2 | 300; 3 | 800 | Yes |
| 8 | 10 | 350; 3 | 425 | Yes |
| 9 | 2 | 250; 3 | 1,475 | Yes |
| 10 | — (untreated) — | | 1,800 | No |
| 11 | — (untreated) — | | 2,800 | No |

EXAMPLE 3

About 200 grams of low viscosity amorphous polypropylene treated with certain Lewis acids also produces permanently pressure-sensitive materials. In general the viscosities of these materials are lower than those produced by treatment with silica-alumina catalyst. The experimental results are summarized in Table III. This data shows that (1) at 250° C. at least 0.075 percent $AlCl_3$ is necessary to produce a pressure-sensitive product; (2) at 200° C. 0.075 percent $AlCl_3$ reduces the viscosity greatly but the product is not pressure sensitive; (3) other aluminum halides such as $AlBr_3$ are catalysts; and (4) weak Lewis acids such as hydrated $ZnCl_2$ are not catalysts for the transformations.

Table III
Treatment of Amorphous Polypropylene with Lewis Acids

| Run | Catalyst Weight % | Temperature, °C.; Time, Hr. | Viscosity at 190° C., cp. | Tacky |
|---|---|---|---|---|
| 1 | $AlCl_3$, 0.01 | 250; 3 | 1,675 | No |
| 2 | $AlCl_3$, 0.05 | 250; 3 | 1,500 | No |
| 3 | $AlCl_3$, 0.075 | 250; 3 | 500 | Yes |
| 4 | $AlCl_3$, 0.075 | 200; 3 | 575 | No |
| 5 | $AlCl_3$, 0.1 | 250; 3 | 700 | Yes |
| 6 | $AlCl_3$, 0.1 | 250; 0.5 | 750 | Yes |
| 7 | $AlBr_3$, 1 | 220; 2 | 251 | Yes |
| 8 | $ZnCl_2$, 0.1 | 250; 3 | 1,550 | No |
| 9 | $ZnCl_2$, 2 | 300; 3 | 1,150 | No |

The modified amorphous polyolefins of this invention are useful in pressure-sensitive adhesives. As pressure-sensitive adhesives they find utility in preparing tapes by applying the adhesive to conventional hot melt procedures to a substrate such as a film which can be prepared from conventional film materials such as a polyester, for example. The pressure-sensitive adhesive can also be applied onto labels, decals, floor tile as well as wall coverings, such as wallpaper, and shelf coverings, such as shelf paper.

Although the invention has been described in considerable detail with particular reference to certain preferred embodiments thereof, variations and modifications can be effected within the spirit and scope of the invention.

We claim:

1. A process for preparing tacky modified amorphous polyolefin compositions useful as pressure-sensitive adhesives which comprises reacting substantially amorphous polyolefin having a melt viscosity of about 100 to 200,000 cp. at 190° C. with at least 1 weight percent of silica-alumina catalyst at a temperature of at least 250° C. to provide a low viscosity, permanently tacky hot-melt pressure-sensitive adhesive.

2. A process according to claim 1 wherein said substantially amorphous polyolefin is a member of the group selected from substantially amorphous homopolymers of 1-olefins containing 3 to 5 carbon atoms, substantially amorphous copolymers prepared from either ethylene and 1-olefins containing 3 to 5 carbon atoms or propylene and 1-butene, and amorphous propylene or 1-butene/higher 1-olefin copolymers containing less than 40 mole percent of at least one higher 1-olefin of the group consisting essentially of 1-hexene, 1-heptene, 1-octene, 1-nonene, and 1-decene.

* * * * *